(12) United States Patent
Ouchi

(10) Patent No.: US 7,486,796 B2
(45) Date of Patent: Feb. 3, 2009

(54) STEREO RECEIVER FOR CONTROLLING CONTINUOUSLY DEGREE OF SEPARATION

(75) Inventor: Hiroya Ouchi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 749 days.

(21) Appl. No.: 10/859,263

(22) Filed: Jun. 2, 2004

(65) Prior Publication Data

US 2004/0252843 A1   Dec. 16, 2004

(30) Foreign Application Priority Data

Jun. 10, 2003   (JP)  .............................. 2003-165303

(51) Int. Cl.
*H04H 5/00* (2006.01)
(52) U.S. Cl. ................. 381/10; 381/13; 381/2
(58) Field of Classification Search ...................... 381/1, 381/2, 119, 3, 10, 13; 348/485, 484, 473, 348/469; 329/341, 315
See application file for complete search history.

(56) References Cited

U.S. PATENT DOCUMENTS 4,480,520 A * 11/1984 Gold ............................ 84/735

5,113,446 A * 5/1992 Kennedy ...................... 381/10

FOREIGN PATENT DOCUMENTS

| JP | 7-28270 | 3/1995 |
|----|---------|--------|
| JP | 6-41398 | 10/1995 |

* cited by examiner

Primary Examiner—Vivian Chin
Assistant Examiner—Con P Tran
(74) Attorney, Agent, or Firm—Brinks Hofer Gilson & Lione

(57) ABSTRACT

A stereo receiver of a simple structure is disclosed capable of continuously controlling the degree of separation of left and right voice signals in accordance with the level of electric field strength. The stereo receiver comprises electric field strength detecting means 9 for detecting the electric field strength of a received signal, and a stereo demodulation circuit 5 for outputting original voice signals of left and right channels. A blend circuit 6 is provided for blending the original voice signals with each other to output blended voice signals of the left and right channels. The degree of blending between the original voice signals is continuously changed correspondingly to the electric field strength. As a result, the S/N, which may deteriorate when the electric field strength is low, can be improved with a simple structure.

3 Claims, 3 Drawing Sheets

STEREO RECEIVER FOR CONTROLLING CONTINUOUSLY DEGREE OF SEPARATION

This application claims the benefit of priority to Japanese Patent Application No. 2003-165303, herein incorporated by reference.

BACKGROUND OF THE INVENTION

1. Field of the Invention

The present invention relates to a stereo receiver, such as an FM stereo receiver or a television receiver, capable of receiving a stereo broadcast.

2. Description of the Related Art

In FM stereo receivers, as countermeasures against noise increase due to a drop in electric field strength or multi-paths, a pseudo-stereo circuit and a switching circuit are provided, electric field strength and multi-path noise are detected, and a demodulation circuit and the switching circuit are controlled in accordance with the level of the electric field strength or the multi-path noise so that the degree of separation between left and right channels is lowered to reduce noise or to output pseudo-stereo signals (for example, refer to Japanese Unexamined Patent Application Publication No. 7-28270 (FIG. 1, FIG. 2, and FIG. 4)).

In the above structure, since the pseudo-stereo circuit and the switching circuit are provided and electric field strength and multi-path noise are detected, the structure becomes complicated.

SUMMARY OF THE INVENTION

Therefore, it is an object of the present invention to simply configure a stereo receiver capable of continuously controlling the degree of separation of left and right voice signals in accordance with the level of electric field strength.

From the foregoing, the present invention provides a stereo receiver comprising: electric field strength detecting means for detecting the electric field strength of a received signal, and a stereo demodulation circuit for outputting original voice signals of left and right channels. A blend circuit is provided for blending the original voice signals with each other to output blended voice signals of the left and right channels. The degree of blending between the original voice signals is continuously changed correspondingly to the electric field strength.

Further, the stereo circuit comprises variable resistance means, first capacitive elements connected in series to both ends of the variable resistance means, respectively, a first resistor for inputting the one original voice signal to the one first capacitive element, and a second resistor for inputting the other original voice signal to the other first capacitive element. The resistance value of the variable resistance means is controlled in accordance with the electric field strength, and the blended voice signals are output from a first connection point between the variable resistance means and the one first capacitive element and a second connection point between the variable resistance means and the other first capacitive element.

Further, the variable resistance means comprise pin diodes, and the currents of the pin diodes are changed in accordance with the electric field strength.

Further, the pin diodes comprise a parallel circuit including two pin diodes whose anodes are connected to each other and two pin diodes whose cathodes are connected to each other. A control voltage is applied between the interconnected anodes and the interconnected cathodes on the basis of the electric field strength.

Further, a second capacitive element is connected between the interconnected anodes and the interconnected cathodes.

Further, at least one of the interconnected anodes and the interconnected cathodes are connected to a reference potential point via a third resistor.

DESCRIPTION OF THE PREFERRED EMBODIMENTS

Figure 1:
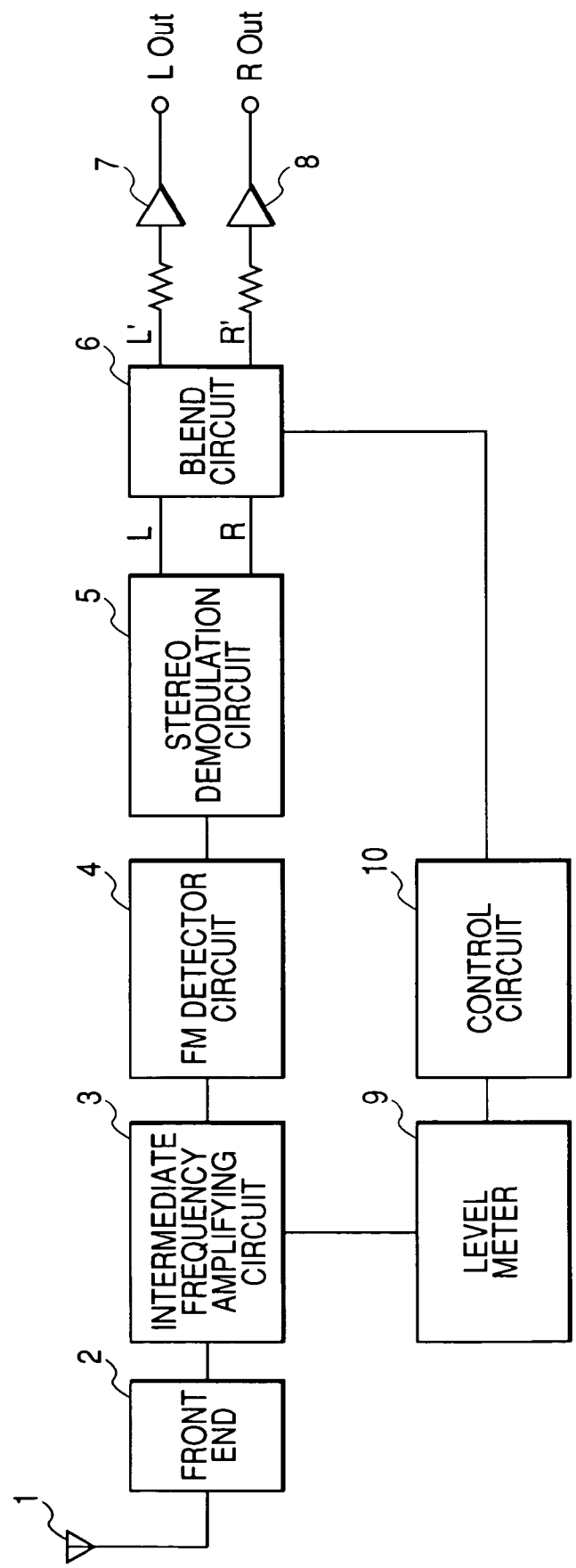
FIG. 1 is a circuit diagram showing the structure of a stereo receiver according to the present invention.

A stereo receiver according to the present invention will be described referring to an example of an FM stereo receiver shown in FIG. 1. A signal received by an antenna 1 is converted into an intermediate frequency signal by a front end 2, and the intermediate frequency signal is amplified by an intermediate frequency amplifying circuit 3 and is input to an FM detector circuit 4. The detected signal output from the FM detector circuit 4 is demodulated by a stereo demodulation circuit 5, and voice signals L and R of left and right channels (referred to as original voice signals) are output from the stereo demodulation circuit 5. The original voice signals L and R of the left and right channels are input to a blend circuit 6 for controlling (blending) the degree of separation. Then, the blended voice signals L' and R' of the left and right channels (referred to as blended voice signals) are output from the blend circuit 6. The blended voice signals L' and R' are respectively output via buffer amplifiers 7 and 8.

On the other hand, electric field strength detecting means (level meter) 9 connected to the intermediate frequency amplifying circuit 3 outputs a detected signal proportional to the electric field strength of the signal received by the antenna. The detected signal is output to a control circuit 10. The control circuit 10 outputs a control voltage according to the electric field strength, and the blend circuit 6 is controlled by means of the controlled voltage.

Figure 2:
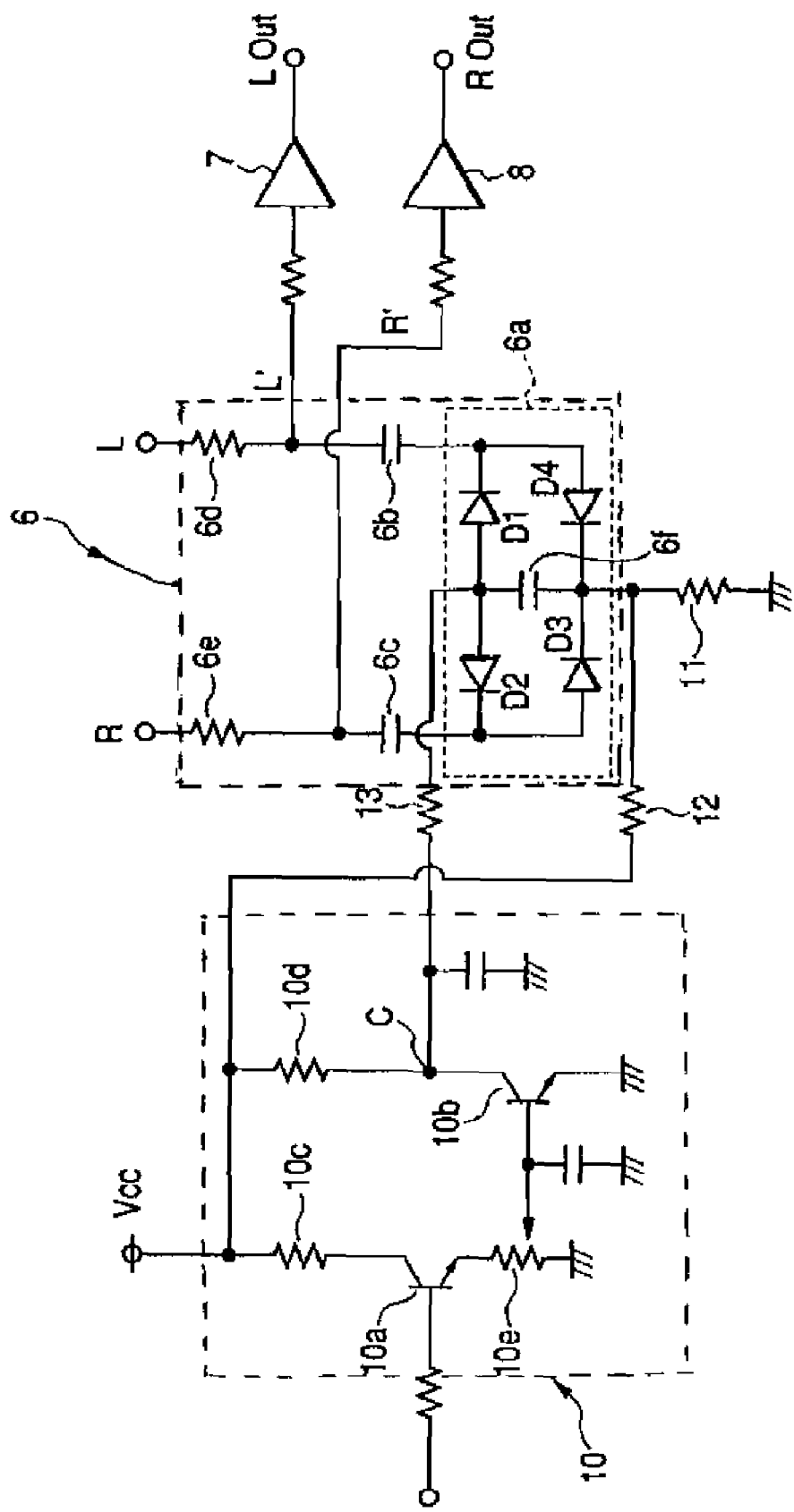
FIG. 2 is a specific circuit diagram of a blend circuit and a control circuit used with the stereo receiver according to the present invention.

FIG. 2 shows a specific circuit structure of the blend circuit 6 and the control circuit 10. The blend circuit 6 includes variable resistance means 6a having four pin diodes D1 to D4, first capacitive elements 6b and 6c connected in series to both ends of the variable resistance means 6a, respectively, a first resistor 6d for inputting the one original voice signal L to the one first capacitive element 6b, and a second resistor 6e for inputting the other original voice signal R to the other first capacitive element 6c. Also, the blended voice signal L' of the left channel is output from a connection point (a first connection point) P1 between the one first capacitive element 6b and the first resistor 6d, and the blended voice signal R' of the right channel is output from a connection point (a second connection point) P2 between the other first capacitive element 6c and the second resistor 6e.

The anodes of the two pin diodes D1 and D2 in the variable resistance means 6a are connected to each other, and the cathodes of the two pin diodes D3 and D4 are connected to each other. Also, the two interconnected pin diodes D1 and D2 and the two interconnected pin diodes D3 and D4 are connected in parallel to each other. Further, the anodes of the two interconnected pin diodes D1 and D2 and the cathodes of the two interconnected pin diodes D3 and D4 are coupled to each other by a second capacitive element 6f. A fixed bias voltage is applied to the cathodes of the two interconnected pin diodes D3 and D4 by a third resistor 11 and a feeding resistor 12.

The control circuit 10 includes a first transistor 10a to whose base an electric field strength detecting signal is input, and a second transistor 10b to whose base an output signal from the emitter of the first transistor 10a is input. The collector of the first transistor 10a and the collector of the second transistor 10b are respectively connected to feeding resistors 10c and 10d, and the emitter of the first transistor 10a is grounded by a variable resistor 10e. The base of the second transistor 10b is connected to the variable resistor 10e, and the emitter of the second transistor 10b is grounded. Also, the collector of the second transistor 10b is connected to the anodes of the interconnected pin diodes D1 and D2 via the resistor 13.

Figure 3:
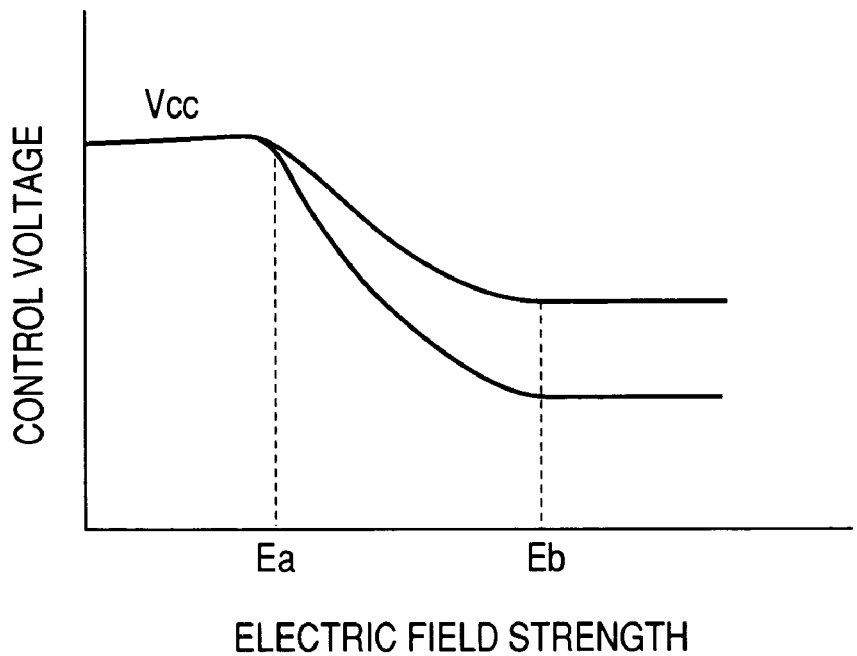
FIG. 3 is a graph showing characteristics of a control voltage output from the control circuit in the stereo receiver according to the present invention.

In the above structure, a voltage appears in the emitter of the first transistor 10a in proportion to the detected signal, and the voltage is appropriately divided by the variable resistor 10e and is input to the base of the second transistor 10b. When the electric field strength becomes the first level Ea or larger, the second transistor 10b starts to be turned on and the control voltage appearing in the collector (point C) drops with a rise in the electric field strength as shown in FIG. 3. Also, when the electric field strength becomes a second level Eb or larger, the voltage becomes approximately constant. A voltage value at this time is determined by adjustment of the variable resistor 10e. The control voltage appearing in the collector of the second transistor is applied to the interconnected anodes of the two pin diodes D1 and D2 that constitute the variable resistance means 6a.

Here, the voltage of the collector of the second transistor 10b when the electric field strength is at the second level Eb (Ea<Eb) becomes lower than a fixed bias voltage (the voltages of the interconnected cathodes of the two pin diodes D3 and D4). If the electric field strength is lower than the second level Eb, the voltage of the collector of the second transistor 10b is set to be higher than the fixed bias voltage. The second level Eb is the electric field strength when S/N of the original voice signals L and R can be well satisfied.

Therefore when the electric field strength becomes the second level Eb or larger, a current does not flow through the four pin diodes D1 to D4 of the variable resistance means 6a, and the resistance value between both ends of the variable resistance means 6a becomes extremely large (theoretically infinite). Accordingly since the original voice signals L and R having a good S/N are not blended with each other, they are input to the corresponding buffer amplifiers 7 and 9 with the maximum separation kept.

Further, when the electric field strength becomes the second level Eb or smaller, a current flows through the four pin diodes D1 to D4 and the resistance value between both ends thereof decreases. Also, the first connection point P1 and the second connection point P2 are coupled by a serial circuit composed of the one first capacitive element 6b, the variable resistance means 6a and the other first capacitive element 6c. As a result, the one original voice signal L appears at the first connection point P1, and also appears at the second connection point P2 via the variable resistance means 6a and the first capacitive elements 6b and 6c. The level of the original voice signal L appearing at the second connection point P2 is lowered. Similarly, the other original voice signal R appears at the second connection point P2, and also appears at the first connection point P1 via the variable resistance means 6a and the first capacitive elements 6b and 6c. The level of the original voice signal R appearing at the second connection point P1 is lowered.

Figure 4:
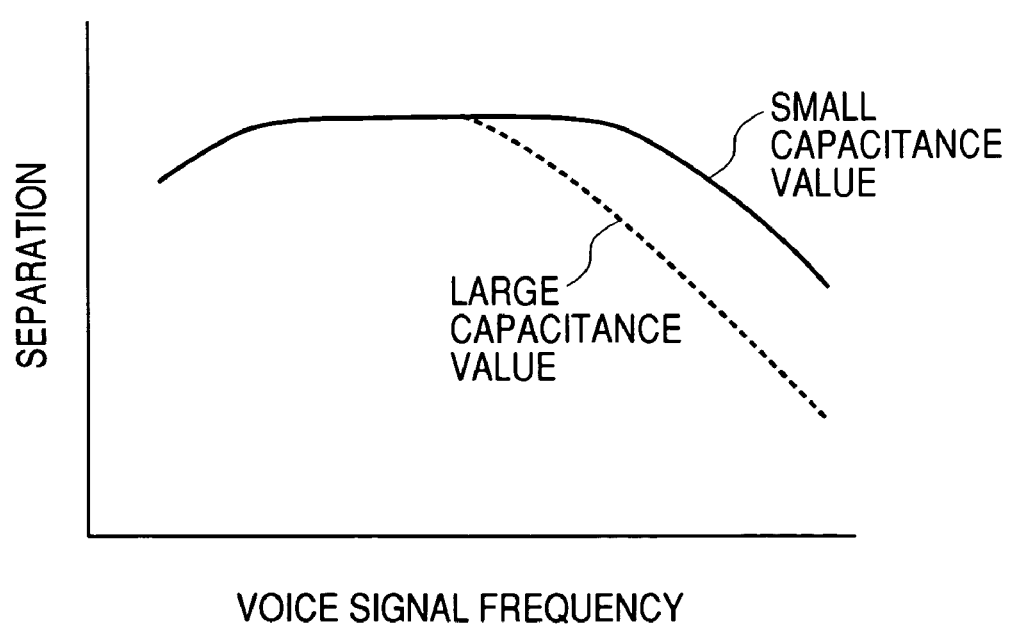
FIG. 4 is a graph showing characteristics of stereo separation obtained by using the stereo receiver according to the present invention.

Therefore, a voice signal (mainly the original voice signal L) into which the original voice signals L and R are blended is output to the first connection point P1. Further, a voice signal (mainly the original voice signal R) into which the original voice signals L and R are blended is output to the second connection point P2. Accordingly, although the stereo separation drops and approaches a monaural signal, the S/N is improved. In this case, the serial circuit of the variable capacitive element 6a and the first capacitive elements 6b and 6c has frequency characteristics whose impedance is lowered as the frequency becomes higher. Thus, as the frequency becomes higher, the degree of blending becomes larger, so that the separation drops as shown in FIG. 4. As a result, the S/N is improved. In this case, as the capacitance value of the first capacitive elements 6b and 6c becomes larger, the degree of blending at a high frequency becomes larger (refer to a dotted line in FIG. 4). Further, as the electric field strength drops, the S/N deteriorates. However, since the impedance drops with the decrease in the electric field strength, the degree of blending also increases, which leads to an improvement in the S/N.

Further, the directions of P-N junction of the two pin diodes D1 and D2 in the variable resistance means 6a become opposite to each other. Thus, the phases of distortion signals generated due to the passage of voice signals become opposite to each other to cancel each other. Consequently, a distortion due to blending does not occur. This can also be similarly applied to the other two pin diodes D3 and D4. Moreover, the second capacitive element 6f is connected between the anodes of the two pin diodes D1 and D2 and the cathodes of the two pin diodes D3 and D4 so that the pin diodes D1 and D3 are opposite to each other in the directions of P-N junction thereof and are connected in parallel to each other. Thus, the distortion generated between the pin diodes D1 and D3 is also cancelled. This is similarly applied to the two pin diodes D2 and D4.

Moreover, the anodes of the two pin diodes D1 and D2 are connected to a power terminal, which is a reference potential point, via resistors 13 and 10d. Thus, a voice signal having a high frequency is attenuated. Similarly, the cathodes of the two pin diodes D3 and D4 are respectively connected to a ground and a power terminal, which are reference potential points via the third resistor and the feeding resistor 12. Thus, a voice signal having a high frequency is attenuated. When either the anodes or the cathodes are connected to the reference potential points, a voice signal having a high frequency is attenuated. Thus, the S/N is improved.

As described above, the present invention provides a stereo receiver comprising: electric field strength detecting means for detecting the electric field strength of a received signal, and a stereo demodulation circuit for outputting original voice signals of left and right channels. A blend circuit is provided for blending the original voice signals with each other to output blended voice signals of the left and right channels. The degree of blending between the original voice signals is continuously changed correspondingly to the magnitude of the electric field strength. Thus, the SIN, which may deteriorate when the electric field strength is low, can be improved with a simple structure.

Further, the stereo circuit comprises variable resistance means, first capacitive elements connected in series to both ends of the variable resistance means, respectively, a first resistor for inputting the one original voice signal to the one first capacitive element, and a second resistor for inputting the other original voice signal to the other first capacitive element. The resistance value of the variable resistance means is controlled in accordance with the electric field strength, and the blended voice signals are output from a first connection point between the variable resistance means and the one first capacitive element and a second connection point between the variable resistance means and the other first capacitive element. Thus, the blend circuit can be configured with a simple circuit.

Further, the variable resistance means comprises pin diodes, and the currents of the pin diodes are changed in accordance with the electric field strength. Thus, the variable resistance means becomes simple.

Further, the pin diodes comprise a parallel circuit including two pin diodes whose anodes are connected to each other and two pin diodes whose cathodes are connected to each other. A control voltage is applied between the interconnected anodes and the interconnected cathodes on the basis of the electric field strength. Thus, a distortion signal, which may be generated when passing though the pin diodes, is cancelled. Consequently, voice signals having a small distortion can be obtained.

Further, a second capacitive element is connected between the interconnected anodes and the interconnected cathodes. Thus, the distortion is further reduced.

Further, at least one of the interconnected anodes and the interconnected cathodes are connected to a reference potential point via a third resistor. Thus, a voice signal at high pass side is attenuated to further improve the S/N.

What is claimed is:

1. A stereo receiver comprising:
    electric field strength detecting means for detecting an electric field strength of a received signal, and
    a stereo demodulation circuit for outputting original voice signals of left and right channels,
    wherein a blend circuit is provided for blending the original voice signals with each other to output blended voice signals of the left and right channels, and
    wherein the degree of blending between the original voice signals is continuously changed correspondingly to a magnitude of the electric field strength,
    wherein the blend circuit comprises variable resistance means, first capacitive elements connected in series to both ends of the variable resistance means, respectively, a first resistor for inputting a first of the original voice signals to one of the first capacitive elements, and a second resistor for inputting a second of the original voice signals to another of the first capacitive elements, the variable resistance means comprising a parallel circuit including two pin diodes whose anodes are connected to each other and two pin diodes whose cathodes are connected to each other, and wherein a control voltage is applied between the interconnected anodes and the interconnected cathodes on the basis of the electric field strength and
    wherein a resistance value of the variable resistance means is controlled in accordance with the electric field strength, and the blended voice signals are output from a first connection point via the variable resistance means and the one first capacitive element and a second connection point via the variable resistance means and the other first capacitive element.

2. The stereo receiver according to claim 1, wherein a second capacitive element is connected between the interconnected anodes and the interconnected cathodes.

3. The stereo receiver according to claim 2, wherein at least one of the interconnected anodes and the interconnected cathodes are connected to a reference potential point via a third resistor.

* * * * *